United States Patent [19]
Moehlenbrink et al.

[11] Patent Number: 5,893,043
[45] Date of Patent: Apr. 6, 1999

[54] PROCESS AND ARRANGEMENT FOR DETERMINING THE POSITION OF AT LEAST ONE POINT OF A TRACK-GUIDED VEHICLE

[75] Inventors: Wolfgang Moehlenbrink, Esslingen; Gerd Moehrke, Stuttgart; Peter Boese, Daisendorf, all of Germany

[73] Assignee: Daimler-Benz AG, Stuttgart, Germany

[21] Appl. No.: 705,717

[22] Filed: Aug. 30, 1996

[30] Foreign Application Priority Data

Aug. 30, 1995 [DE] Germany ............... 195 32 104.9

[51] Int. Cl.$^6$ .................. G01C 21/16; G06G 7/78; B61C 17/12; B61L 3/16
[52] U.S. Cl. .................. 701/207; 701/209; 701/211; 701/213; 246/182 C; 246/187 C
[58] Field of Search .................. 701/206, 207, 701/208, 209, 210, 211, 213, 216; 246/167 R, 182 R, 182 C, 187 C, 5

[56] References Cited

U.S. PATENT DOCUMENTS

| | | | |
|---|---|---|---|
| 4,582,280 | 4/1986 | Nichols et al. | 340/876.13 |
| 4,974,259 | 11/1990 | Takahashi et al. | 455/39 |
| 5,072,396 | 12/1991 | Fitzpatrick et al. | |
| 5,108,052 | 4/1992 | Malewicki et al. | 246/5 |
| 5,129,605 | 7/1992 | Burns et al. | 246/5 |
| 5,517,419 | 5/1996 | Lanckton et al. | 701/216 |
| 5,548,516 | 8/1996 | Gudat et al. | 701/200 |
| 5,554,982 | 9/1996 | Shirkey et al. | 246/7 |
| 5,740,049 | 4/1998 | Kaise | 701/213 |
| 5,740,547 | 4/1998 | Kull et al. | 701/208 |

FOREIGN PATENT DOCUMENTS

| | | |
|---|---|---|
| 0 593 910 | 4/1994 | European Pat. Off. . |
| 0 605 848 | 7/1994 | European Pat. Off. . |
| 31 06 629 | 9/1982 | Germany . |
| 32 00 811 | 7/1983 | Germany . |
| 195 05 487 | 9/1995 | Germany . |
| WO 91/09375 | 6/1991 | WIPO . |

OTHER PUBLICATIONS

IEEE 1989 International Conference on Consumer Electronics Digest of Technical Papers ICCE, Cat. No. 89CH2724–3, "Navigation and Communications Systems", pp. 286–287, Ono et al.
Patent Abstracts of Japan, vol. 18, No. 315 (p.1755), Jun. 15, 1994 & JP–A–06 074778 (Mitsubishi Electric Corp), Mar. 18, 1994 –Abstract.
Patent Abstracts of Japan, vol. 17, No. 600 (p.1637), Nov. 4, 1993 & JP–A–05 181417 (Mitsubishi Electric Corp), Jul. 23, 1993 –Abstract.
Journal Essay by R.R. Roßberg, "Line–Type Train Influencing", *Eisenbahntechnische Praxis* 1967, pp. 2–6.
Publication by J.M. Ory, et al., "Procédé Non Conventionel de Localisation d'un Mobil Ferroviaire –Application et Réalisation aà la SNCF", *ITTG* 93, Symposium International sur L'Innovation Technologique dans le Transport Guides, Lille France 1993, pp. 277–283.
Patent Abstracts of Japan, vol. 95, No. 011 & JP–A–07 294622 (Japan Radio Co Ltd), Nov. 10, 1995 –Abstract.

*Primary Examiner*—Virna Lissi Mojica
*Attorney, Agent, or Firm*—Evenson, McKeown, Edwards & Lenahan, P.L.L.C.

[57] ABSTRACT

A process and an arrangement for determining the position of a vehicle moving on a given track by using a map matching process is provided. At least three types of position measuring data in the form of object site data, path length data and route course data are obtained. By use of a computer unit, for each type of measuring data, a data correlation is carried out with a respective pertaining stored desired data quantity for the determination of respective position results which then are evaluated, in an m-out-of-n decision making process. In this process, a given number m of the n determined position results is taken into account. With comparatively low expenditures, this permits a reliable and error-tolerant vehicle position determination for use, for example, for railway vehicles.

10 Claims, 3 Drawing Sheets

PROCESS AND ARRANGEMENT FOR DETERMINING THE POSITION OF AT LEAST ONE POINT OF A TRACK-GUIDED VEHICLE

BACKGROUND AND SUMMARY OF THE INVENTION

This invention relates to a process and an arrangement for determining the position of at least one point of a vehicle moving along a given track as well as their use for determining the distance of various vehicle points. An important application of the invention relates to precise position determination and checking of the length of railway vehicles, i.e., trains.

With respect to determining the position of track-guided vehicles, e.g. railway vehicles, it is known to detect the presence of a train in a respective track section using assigned track circuits or electrical contacts in the form of electronic track contacts or axle counters. Furthermore, systems are known for influencing a train in a punctiform manner—see German patent Document DE 31 06 629 C2—and for the line-shaped influencing of a train—see European patent Document Offenlegungsschrift EP 0 593 910 A1, which can also be utilized for vehicle locating. A system of this type, with a line-type influencing of the train, in which position measuring data are obtained for determining the position by detecting track conductor cables with crossing points existing along the track, on the one hand, and by detecting the covered distance via a path-measuring wheel, on the other hand, independently of one another, is described in the journal essay by R. R. Roßberg, "Line-Type Train Influencing", *Eisenbahntechnische Praxis* 1967, Page 2 to 6. The obtained data are compared with one another in this system. In U.S. Patent Document U.S. Pat. No. 5,129,605, a system for determining the position of railway trains is described in which, preferably, data of a satellite-based system in the form of the so-called GPS (Global Positioning System) system are used for determining the position with the aid of special filter algorithms and compensating calculations. In intervals without GPS data, measuring data of a wheel speed indicator or of path markers placed on the side of the path are used.

In the publication by J. M. Ory, et al., "Procédé non conventional de localisation d'un mobil ferroviaire—Application et réalisation à la SNCF", ITTG 93, Symposium International sur L'Innovation Technologique dans le Transport Guides, Lille, France 1993, Actes S. 277, a process is described for determining the position of track-guided vehicles from a detection of the track position and of the track wear profile. The sensing system contains a special measuring car with three bogies and an extremely rigid construction. The measuring car senses the rail level as well as superelevations, peaks and variations of the rail spacing. From the respective measured rail profile, by means of a data correlation with a corresponding previously recorded desired data quantity, the position on the path is derived. However, in this case, comparatively high computing expenditures are required and the site precision is limited to approximately 10 m.

In European patent document EP 0 605 848 A1, a process is indicated for determining the position of railway trains using an inertial platform in which the vehicle location is calculated with a priori data by a recursive estimation using Kalman filtering. For promoting the position determination, path markers along the path are also required.

An arrangement for determining the location of a track-guided vehicle which uses such path markers along a travelled route is also disclosed in German patent document Offenlegungsschrift DE 32 00 811 A1.

From U.S. Patent Document U.S. Pat. No. 5,072,396, a navigation system for airplanes is known. In this navigation system, infrared aerial photos are taken of the respective flown-over area for determining the position of the airplane. The corresponding measuring data are correlated with data of a list which was prepared beforehand of the locations of characteristic objects in the landscape.

The present invention is based on the technical problem of providing a process and an arrangement of the above-mentioned type by which a precise position determination for track-guided vehicles is possible with a comparatively high error tolerance. The process and arrangement can also be used for monitoring the vehicle length, for example, for controlling the completeness of the train in the case of long railway trains.

This problem is solved by a process for determining the position of at least one point of a vehicle moving on a given track. In a mutually independent manner, at least a number n of different types of position measuring data, with n being greater than or equal to three, are obtained by detecting objects present along the track, the travelled path length, and the travelled route course. For each type of detected measuring data, a position result is determined by a respective correlation of the detected measuring data with a pertaining filed desired data quantity. The vehicle position is determined from the obtained position results by an m-out-of-n decision making process, which contains the determination of a given number m (for example, 2) from the number n of independently determined position results situated within an interval with a given resolution width. For the analysis, the concerned interval is evaluated as the position to be determined.

An arrangement is also provided to solve the problem. The arrangement determines the position of at least one point of a vehicle moving along a given track, in which, for carrying out the position determination for the at least one point of the vehicle according to the above process, the arrangement includes a computer unit for carrying out the data correlations as well as the m-out-of-n decision finding process; memories which can be read out by the computer unit and in which the desired data quantities are filed; and a sensing system for obtaining position measuring data which includes at least an object recognition sensor unit for obtaining object site data, a path length measuring unit for obtaining path length data and an angle-of-rotation measuring unit for obtaining route course data, being arranged on the vehicle side.

In the novel process, first position measuring data are obtained in at least three mutually independent manners at relatively low expenditures. The data are then, each separately, correlated with a pertaining stored desired data quantity; that is, the data are compared in the form of a so-called map-matching. This is followed by a decision making step, in which the thus obtained position results are mutually analyzed using an m-out-of-n selection process. This approach consists of determining in which position interval with a predetermined resolution width of, for example, 1 m, a given number m of the obtained number n of mutually independent position results is situated. The concerned interval is then valued as the vehicle position to be determined, in which case the other n-m position results are not taken into account. This excludes measuring errors in a simple and reliable manner, which makes the process error-tolerant and permits a position determination which is reliable with respect to the signalling technique.

In the case of this process, satellite systems and route-side devices are not absolutely necessary. On the contrary, for determining the vehicle position according to this process, it is sufficient to detect objects which are present along the route anyhow, as well as the covered path length or, as an equivalent thereto, the respective travelling speed and the course of the route. The route-side arrangement of transponders or other special path markers is optional, while the structure which normally exists is utilized for the detection of characteristic objects. For track-guided vehicles, particularly suitable objects are used as reference points for track position measuring, such as marked measuring points and overhead line masts. Other landscape-specific objects, such as masts, bridge elements, mouths of tunnels, point mechanisms, and the like, can also be used.

For implementing the process, an arrangement is suitable which requires only elements arranged on the vehicle side in the form of an appropriately designed computer unit, the required data memories, and the suitable sensors. The sensors include at least one object recognition sensor unit, one path length measuring unit and one angle-of-rotation measuring unit. An important advantage achieved as the result of this process and arrangement consists of low infrastructural expenditures for the position determination and of the fact that reasonably priced commercially available elements can be used for the configuration of a reliable, error-tolerant system. In addition, the high precision of the systems obtained at the given expenditures, if required, permits a considerable increase in the operational route capacity in the case of track-guided traffic systems. In connection with suitable communication systems, improvements can also be achieved with respect to the disposition and logistics in this traffic system.

In a preferred embodiment of the process, the detection of path markers is utilized, which are arranged on the track side, for obtaining another type of position measuring data and a further independent position result. This may be advantageous particularly for applications in which the route-side path markers already exist for different reasons. For implementing the process, an arrangement having a sensor system includes a path marker reading apparatus is particularly suitable. A pertaining desired data quantity of the path markers is filed in a path marker list memory which can be read out by the computer unit.

In the case of a use of the process, a separate position determination takes place for a forward and a rearward position of the vehicle, as the result of which, by forming the difference, the distance between these two points can be determined. On the one hand, the vehicle length can therefore be continuously monitored. This may be desirable particularly for checking the completeness of long railway trains. On the other hand, because of an evaluation of successively obtained spacing results, the position determination results can additionally be assured with respect to their reliability. For this application purpose, a particular arrangement is further developed.

For recognizing objects along a given track, particularly at least one picture camera or a picture-generating radar sensor can be disposed in the process-implementing arrangement. In each case, the camera or sensor is provided with a processing unit connected downstream.

A further preferred arrangement contains a GPS receiving part by which, for increasing the measuring precision of the system particularly when the vehicle is stopped, high-precision measurements can be carried out at support points. The data of the other position determination methods can then in each case be updated or corrected appropriately.

Other objects, advantages and novel features of the present invention will become apparent from the following detailed description of the invention when considered in conjunction with the accompanying drawings.

DETAILED DESCRIPTION OF THE DRAWINGS

Figure 1:
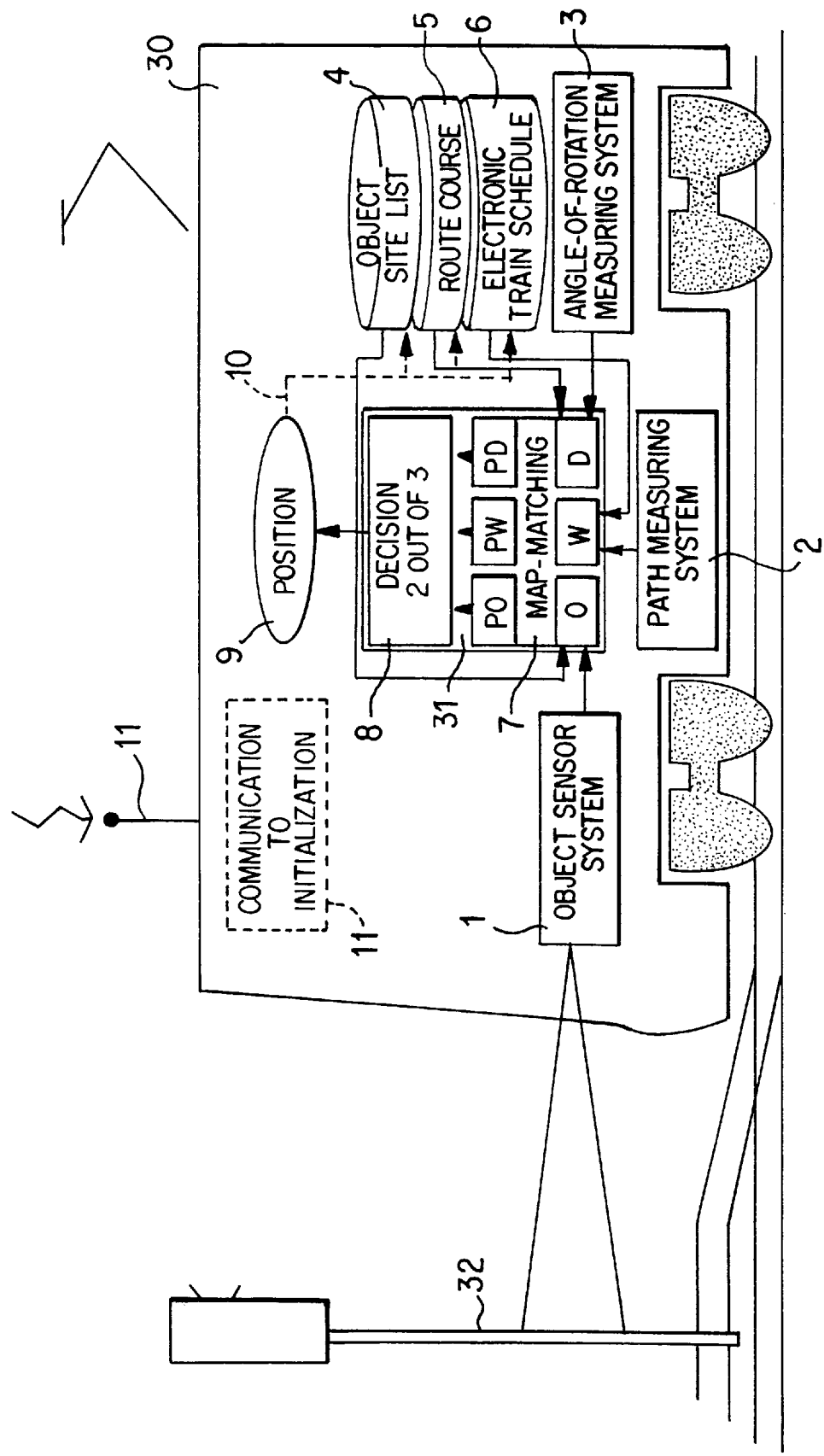
FIG. 1 is a schematic block diagram of a first arrangement for determining the position of a railway vehicle according to the invention.

The arrangement for the position determination illustrated in FIG. 1 is housed with all its required elements in a forward engine car 30 of a railway vehicle which is otherwise not shown. The arrangement contains a suitable computer 31 as a central process-implementing unit. In pertaining memories 4, 5, 6, which can be read out by the computer 31, first, desired data with respect to an object site list; second, desired route course data; and third, desired data of an electronic train schedule are stored. Correspondingly, as the result of these three types of field desired data, the arrangement comprises three types of sensor units, specifically an object sensor system 1, a path measuring system 2 and an angle-of-rotation measuring system 3.

The object sensor system 1 contains one or more video cameras with an image processing unit connected with each, or a picture-generating radar system. The system 1 senses and identifies objects arranged laterally along the track route; in the illustrated case, for example, a signal mast. The two above-mentioned object sensor systems are particularly suitable because they reliably detect the different landscape characteristics on the basis of their highly flexible measuring principle. As alternatives, other current acoustic, optical, magnetic or electromagnetic sensor systems can also be used which permit a clear object identification along the track route.

For example, a rotational wheel speed sensing system, a speed measuring sensing system containing optical or magnetic sensors or a Doppler radar system, or an inertial sensor acceleration measuring system, are suitable for use as the path measuring system 2. By means of the path measuring system 2, a direct path length measurement or an indirect path length measurement derived from speed measurements can take place particularly between the respective object points 32 recognized by the object sensor system 1. For example, an inertial sensing system which senses the angle-of-rotation speed, or an arrangement of angle-of-rotation sensors in a bogie, can be used as the angle-of-rotation measuring system 3. The angle-of-rotation measuring system 3 is used for detecting the route course or for the fast determination of the turn-off direction at junctions along the route.

The output signals of the sensor units 1, 2, 3 are supplied to the computer 31 which, by means of these measuring data and the data stored in the memories 4, 5, 6, carries out the position determination in the following manner. The object site data (O) supplied by the object sensor system 1 are correlated by a data correlating unit 7 of the computer 31 with the desired data quantity read out of the object site list memory 4; that is, the concerned data are examined with respect to the best possible conformity which is called "map matching". Such a data conformity comparison is known per se and therefore does not have to be described further. The "map matching" is appropriately interpreted by the person skilled in the art relative to the respective application. This data correlation of the object site data (O) forms a first position result (PO). In parallel to the object site data correlation, the data correlation unit 7 of the computer 31 correlates the data supplied by the path measuring system 2 by way of the travelled path length (W) with the corresponding desired data stored in the train schedule memory 6 and, therefrom, determines a second position result (PW). As the third parallel measure, by means of the data correlation unit 7 of the computer 31, the route course measuring data (D) of the angle-of-rotation measuring system 3 are correlated with the corresponding desired data quantity stored in the route course memory 5, from which a third position result (PD) is derived. In an analysis unit 8 connected with the data correlation unit 7 in the processing system, the computer 31 subjects the three position results (PO, PW, PD) obtained in parallel and independently from one another to a 2-out-of-3 decision finding process. This process consists of determining within which position interval with a given limit of resolution of, for example, 1m, at least two of the position results are situated. The concerned position interval will then be output precisely as the searched vehicle position 9 to the given limit of resolution.

The final vehicle position 9 determined in this manner, as illustrated in FIG. 1, will be returned to the data memories 4, 5, 6 of the object site list, of the route course, and of the train schedule, whereby a recursive filter 10 is created which must be initialized once at the beginning of the operation by way of a suitable communication device 11. Even when two of the three position-detecting sensor units 1, 2, 3 fail, via this recursion filter 10, a reliable detection of errors during the position measuring will still be possible. As a result, for reasons of safety, a stopping of the train is required only after a relatively improbable failure of all three mutually independent sensor systems 1, 2, 3 occurs.

As demonstrated, the arrangement according to FIG. 1 performs a reliable and error-tolerant vehicle position determination with relatively low expenditures by using combined current components and algorithms. At the same time, the arrangement of FIG. 1 is also suitable for generating the desired data quantities with respect to the route course and the object site list, if they are not available from existing measuring documents. When the respective desired data quantity is established, a processing of the measuring data by the computer 31 is recommended using suitable conventional compensation processes. Whereas, for the computer part 8 which carries out the 2-out-of-3 decision finding process, a reliable computer system part is required, the data correlation unit 7 of the computer 31 as well as the computer part for establishing the desired data quantities for the object site list memory 4 and the route course memory 5 not shown in detail do not have to be such reliable system parts.

Figure 2:
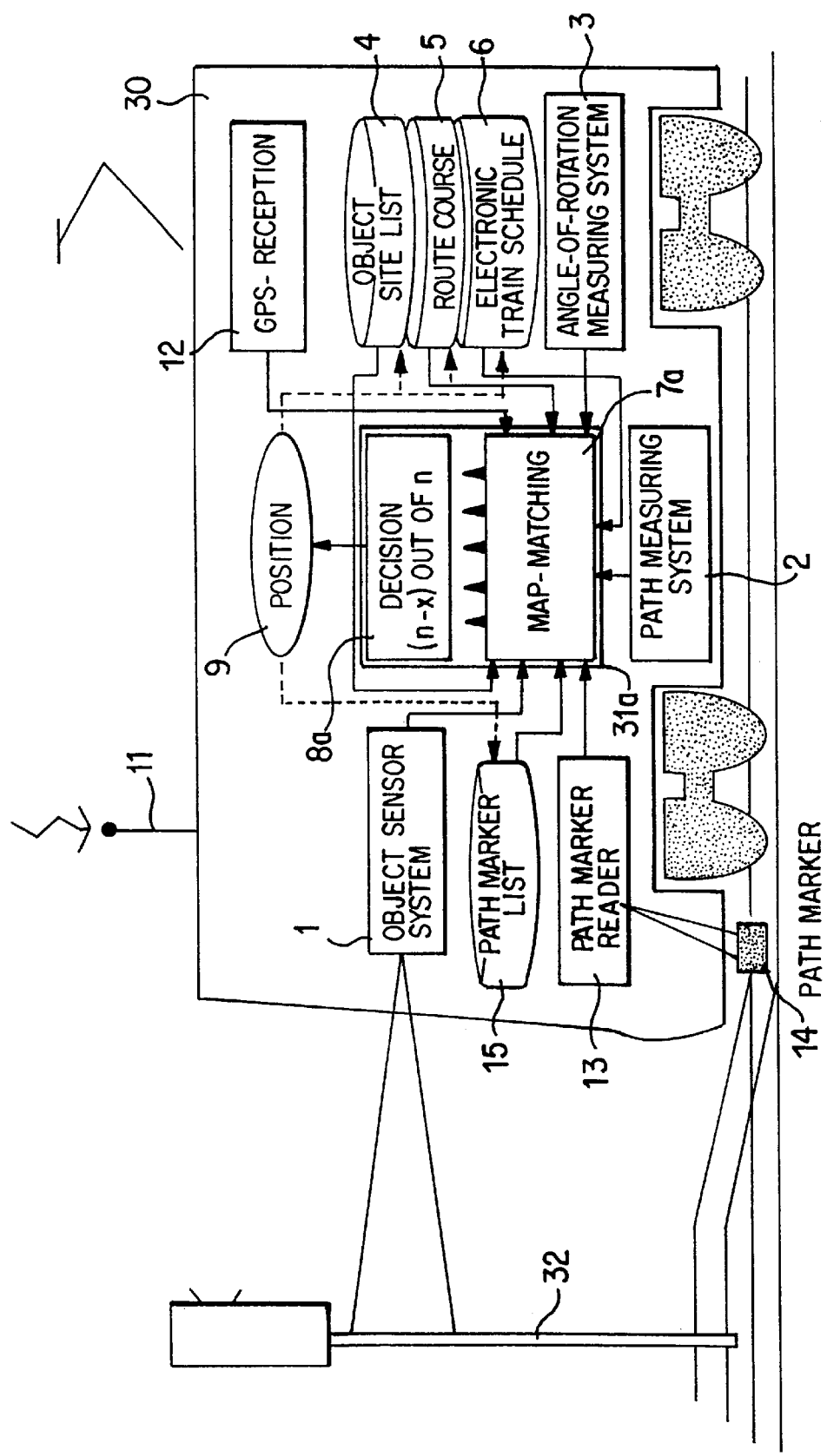
FIG. 2 is a schematic block diagram of a second arrangement for determining the position of a railway vehicle according to the invention.

If required, a GPS-reception part can be integrated into the system for increasing the measuring precision, by which, particularly during a vehicle stoppage, high-precision position measurements can be carried out at support points, particularly also for establishing desired-data quantities with respect to the object site list 4 and the route course 5. Such an arrangement is illustrated in FIG. 2. In addition to the components illustrated in FIG. 1, the arrangement contains a GPS-reception part 12. In FIG. 2, components which have the same function are provided with the same reference numbers.

With respect to the description of the construction and function building method of the common components, reference can be made to the above statements in connection with FIG. 1. Furthermore, the arrangement of FIG. 2 also has a fourth type of position determination by means of the recognition of path markers 14 arranged on the route side. For detecting the path markers 14, a corresponding path marker reading unit 13 is used and the pertaining desired data quantity of the path markers is stored in a path marker list memory 15. The computer 31a for the position determination is appropriately modified with respect to that of FIG. 1. In addition to the three parallel data correlations carried out by the arrangement according to FIG. 1, the computer 31a carries out in its data correlation unit 7a a fourth data correlation during which the data received from the path marker reading apparatus 13 are compared with respect to the best possible conformity with the desired path marker data read out of the path marker list memory 15. The output signal of the GPS-reception part 12 is also supplied to the data correlation unit 7a. According to the expenditure/benefit relation in the given application case, other methods of determining the position for obtaining further preliminary position results via map matching can also be provided.

All position results determined by the data correlation unit 7a are then supplied to an analysis unit 8a of the computer 31a. The analysis unit 8a makes an (n–x)-of-n decision from the number n of supplied position results, x being the number of position results not used for the analysis; that is, the analysis takes place on the basis of a number m=n–x of the total of n position results. Then, as described in FIG. 1, the analysis can consist of indicating a resolution limit of 1m, for example, and of determining in which position interval of this duration at least a number m of the n independently obtained position results is situated. As a result, the searched position is then found to the given resolution limit and is supplied to the output 9 by the analysis unit 8a. The emitted position data 9, in turn, as indicated by a broken line, while forming a recursion filter 10, are then returned to the existing data memories (4 to 6). Here also, the data is returned into the path marker list memory 15. To the extent not described above, the same method of operation and the same characteristics and advantages are obtained for the arrangement of FIG. 2 as described for the arrangement of FIG. 1, to which reference can be made.

Figure 3:
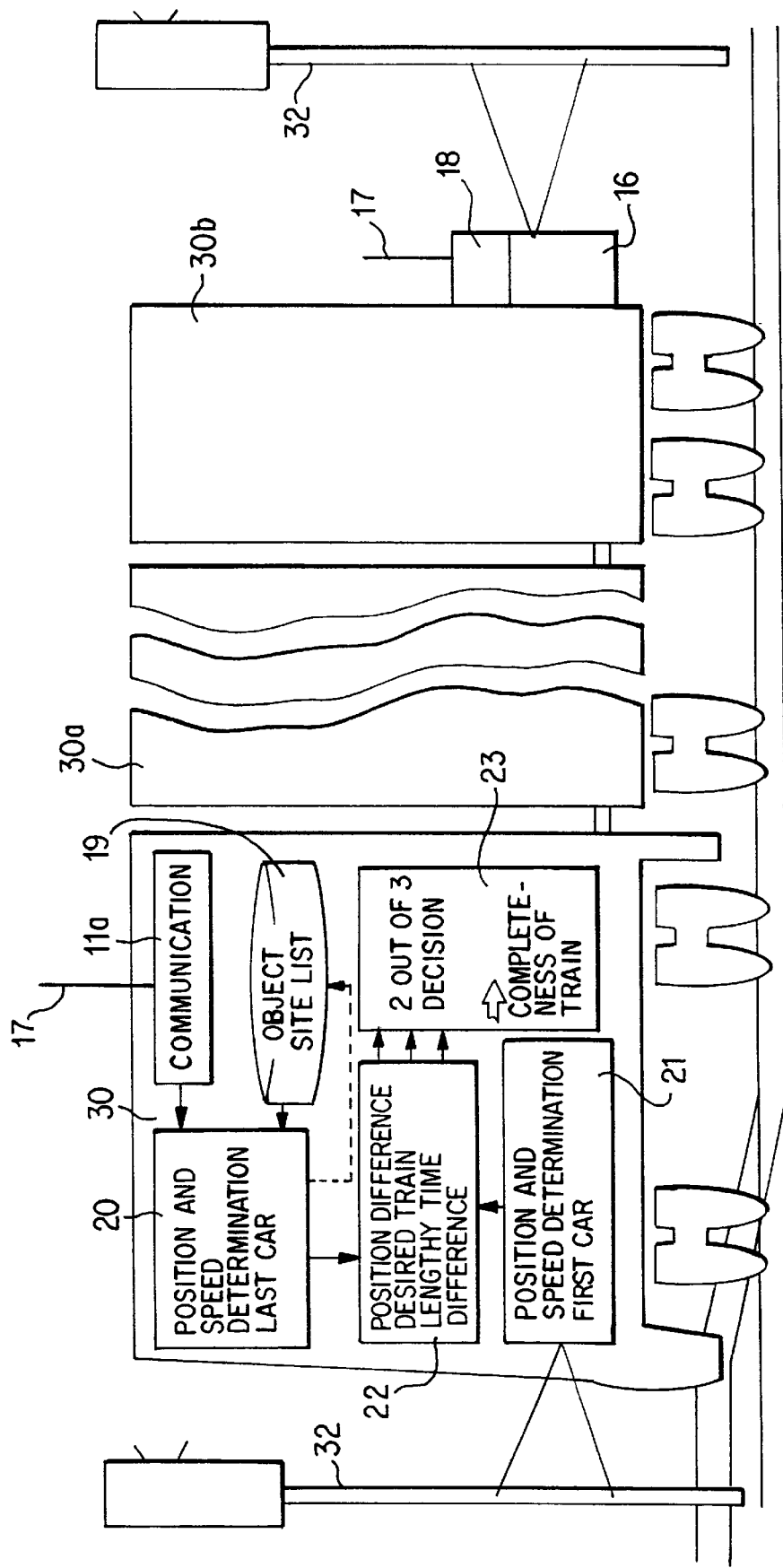
FIG. 3 is a schematic block diagram of third arrangement for determining the position of a railway vehicle according to the invention.

FIG. 3 shows a position determination arrangement which is expanded with respect to those of FIGS. 1 and 2. First, in the forward engine car 30 of a multi-member railway train which, behind the most forward engine car, has a plurality of additional engine cars 30a to a last engine car 30b, the arrangement of FIG. 3 contains an arrangement according to FIG. 1 or FIG. 2 by which a position determination of the forward engine train 30 is carried out as described above. In FIG. 3, the corresponding arrangement part, as a whole, is represented by a function block 21, which naturally also comprises the object sensor system for detecting prominent objects, such as the illustrated signal masts. In addition, the arrangement of FIG. 3 is equipped for the continuous checking of the completeness of the train.

For this purpose, a second object recognition sensor unit 16 in the form of an image detection and image processing system operating on the basis of optical rays or radar rays is mounted on the last car 30b. By way of a coupled communication unit 18, the pertaining position measuring data of the object recognition sensor unit 16 of the last car 30b are transmitted by way of a wireless communication route 17 to a corresponding communication unit 11a mounted on the most forward engine car 30. The communication unit 11a transmits the received data to a position determination unit 20 which, in its construction and method of operation, essentially corresponds to one of the arrangements according to FIG. 1 or 2. By means of the correlation of the receiving data with the corresponding desired data quantity from a pertaining object site list memory 19, the position determination unit 20 determines the position of the last car 30b in the same manner as carried out by the corresponding position determination unit 21 for the first car 30.

As indicated in FIG. 3, if required for the purpose of simplification, at least one of the two position determinations can be limited to obtaining only a single position result by the correlation of the data recorded by the respective object recognition sensor unit with the desired data quantity stored in the object site list memory 19. The reason is that, in the case of this arrangement, an additional operational reliability and therefore error tolerance is provided by the fact that the correctness of the position determination can be ensured by the comparison of the results obtained for the last car 30b with those which were obtained for the first car 30. In a unit 22 connected behind the position determination units 21, 22, by means of forming the difference of the positions of the first 30 and of the last car 30b determined at a respective point in time, the distance of the two cars 30, 30b and thus the length of the train is determined directly. Furthermore, this unit 22 forms the time difference between a detection of the same object 32, on the one hand, by means of the object recognition sensor unit of the first car 30 and, on the other hand, by that of the last car 30b. The unit 22 multiplies the time difference with the average train speed during this time interval, whereby the conformity of the two measuring results can be checked and measured errors can be reliably recognized. In another unit 23 which follows, a 2-out-of-3 decision making process is carried out in which the position difference data or the data with respect to the time difference multiplied with the train speed are compared with data concerning the desired train length which were stored beforehand or determined from measurements over an extended time period. This permits a continuous monitoring of the completeness of the train. A comparison of the speeds derived from the position data for the first car 30, as well as for the last car 30b, additionally ensures the measuring results.

It is understood that the arrangement according to FIG. 3, depending on how it is equipped, can carry out all functions which were explained with respect to the arrangements of FIGS. 1 and 2. It is further understood that the described devices, by being installed in a corresponding measuring vehicle, can also be used for determining the position of arbitrary objects along the route of a given track, for the purpose of which the measuring vehicle will then travel along the corresponding track.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for determining a position of at least one point of a vehicle moving on a given track, the process comprising the steps of:

obtaining in a mutually independent manner at least a number n of different types of position measuring data, with n being greater than or equal to three, by detecting objects present along the given track, a travelled path length of the vehicle, and a travelled route course of the vehicle;

determining a position result for each different type of position measuring data detected using a respective correlation of the detected position measuring data with a corresponding stored desired data quantity; and determining the position of the vehicle from the position result for each type of detected measuring data by performing an m-out-of-n decision making process, where m=(n−x) and x is defined by the number of positions results not used for the analysis, said process determining a given number m from the number n of independently determined position results situated within an interval having a given resolution width, said interval being evaluated as the position to be determined.

2. The process according to claim 1, further comprising the step of determining one of said different types of position measuring data by detecting path markers arranged along the given track.

3. The process according to claim 1, further comprising the step of recursively returning the determined position of the vehicle to the stored desired data quantities.

4. The process according to claim 1, further comprising the steps of:

determining a distance between a forward point and a rearward point of the vehicle by performing the above steps independently of one another for the forward point and the rearward point of the vehicle; and determining the distance between the forward point and the rearward point by forming a difference of the two position results.

5. An arrangement for determining a position of at least one point of a vehicle moving along a given track, the arrangement comprising:

a computer unit for carrying out data correlations as well as an m-out-of-n decision finding process, wherein n is the number of different types of position measuring data that are obtained and wherein m=(n−x) and x is defined by the number of positions results not used for the analysis;

a plurality of memories coupled to said computer unit, said memories being read out by said computer unit and having stored therein desired data quantities; and a sensing system for obtaining position measuring data, said sensing system including at least an object recognition sensor unit for obtaining object site data, a path length measuring unit for obtaining path length data, and an angle-of-rotation measuring unit for obtaining route course data being arranged on the side of the vehicle.

6. The arrangement according to claim 5, wherein said object recognition sensor comprises one of a camera having a picture processing device coupled thereto, and a picture-generating radar sensor having a signal processing device coupled thereto.

7. The arrangement according to claim 5, wherein said sensor for obtaining the position measuring data further comprises a path marker reading apparatus; and a path marker list memory having stored therein pertaining desired data quantity of various path markers, said pertaining desired data quantity being read out of said path marker list memory by said computer unit.

8. The arrangement according to claim 5, further comprising a GPS-reception part having an output signal supplied to said computer unit.

9. The arrangement according to claim 5, wherein said arrangement determines the position of a forward point and a rearward point of the vehicle;

wherein said computer unit, said plurality of memories, and said sensor system are arranged on one of the forward or rearward points of the vehicle;

wherein on the other of said forward or rearward points of the vehicle, at least one sensor unit is provided which corresponds to one of the sensor units in the sensor system arranged at said one point;

a communication device for transmitting the position measuring data, obtained by the at least one sensor unit positioned at the other point, to said computer unit housed at said one first point; and wherein said computer unit, in addition to determining a position of said one point of the vehicle, also determines a position of said other point of the vehicle via data correlation of the transmitted position measuring data with the pertaining desired data quantity.

10. The arrangement according to claim 9, further comprising means for determining a distance between the forward and rearward points of the vehicle by forming a difference of the positions of the forward point and rearward point of the vehicle in said computer unit.

* * * * *